(12) United States Patent
Ware

(10) Patent No.: US 7,572,852 B1
(45) Date of Patent: Aug. 11, 2009

(54) CONCRETE CRACK FILLER COMPOSITION AND METHOD

(76) Inventor: Don H. Ware, 720 Tern Ct., Nashville, TN (US) 37221

( * ) Notice: Subject to any disclaimer, the term of this patent is extended or adjusted under 35 U.S.C. 154(b) by 620 days.

(21) Appl. No.: 11/358,704

(22) Filed: Feb. 21, 2006

Related U.S. Application Data

(62) Division of application No. 10/079,144, filed on Feb. 19, 2002, now abandoned.

(51) Int. Cl.
*C08F 236/12* (2006.01)

(52) U.S. Cl. .................. 524/297; 524/442; 524/492

(58) Field of Classification Search .............. 524/297, 524/492, 442
See application file for complete search history.

(56) References Cited

U.S. PATENT DOCUMENTS

| | | | | |
|---|---|---|---|---|
| 3,025,256 A | * | 3/1962 | Janota et al. | .................. 524/5 |
| 3,053,792 A | * | 9/1962 | Ikeda | ....................... 524/849 |
| 3,126,355 A | * | 3/1964 | Burten et al. | ................ 524/21 |
| 3,196,122 A | * | 7/1965 | Evans | ....................... 427/140 |
| 3,240,736 A | * | 3/1966 | Beckwith | ..................... 524/2 |
| 3,917,771 A | * | 11/1975 | Basile | ....................... 264/35 |
| 3,940,358 A | * | 2/1976 | Bernett et al. | ............... 523/220 |
| 4,205,040 A | | 5/1980 | Aoyama et al. | |
| 4,687,790 A | * | 8/1987 | Andreichuk | ............... 523/130 |
| 4,810,748 A | | 3/1989 | Spells | |
| 4,915,888 A | | 4/1990 | Sato | |
| 4,965,097 A | | 10/1990 | Bach | |
| 5,069,939 A | * | 12/1991 | McKinnon | .................. 427/262 |
| 5,451,620 A | * | 9/1995 | Cepeda-Guerra | ........... 523/514 |
| 5,494,947 A | * | 2/1996 | Kaplan | ...................... 523/122 |
| 5,634,307 A | | 6/1997 | Larriberot et al. | |
| 6,016,635 A | | 1/2000 | Shaw et al. | |
| 6,147,149 A | * | 11/2000 | Anderson et al. | ........... 524/407 |
| 6,159,401 A | | 12/2000 | Hoesch | |
| 6,423,805 B1 | * | 7/2002 | Bacho et al. | ................. 526/319 |
| 2002/0016399 A1 | * | 2/2002 | Mazur | ........................ 524/425 |

FOREIGN PATENT DOCUMENTS

| | | |
|---|---|---|
| DE | 3617966 A1 | 12/1987 |
| JP | 09067574 A * | 3/1997 |

OTHER PUBLICATIONS

Talend, Dan, "A World of Winners," "Hanley-Wood's Concrete & Masonry Construction Products," (May/Jun. 2003), pp. 17, 20.*
World of Concrete 2003 Most Innovative Products award to Clemons Concrete Coatings.*
JPO machine translation for JP 09067574 A.*
"AboCrete" product materials (obtained from www.abatron.com/home004.htm on Feb. 25, 2004), All text and images copyright 1996-2000, Abatron, Inc..*
"Mortar Repair from QUIKRETE® Ideal for Tuck-pointing and Sealing Masonry Joints" press release dated Aug. 13, 2000 (obtained from www.quikrete.com/inside/release_813mortar.html on Feb. 25, 2004).*
QUIKRETE Material Safety Data Sheet, Aug. 2000, 3 pages, for Product #8640.
QUIKRETE Line of Products Advertisement, 1 page, for Product #8640 (Gray Concrete Crack Seal).
Union Carbide Material Safety Data Sheet, Jun. 2000, 12 pages, for UCAR(TM) 413.

* cited by examiner

*Primary Examiner*—Edward J Cain
(74) *Attorney, Agent, or Firm*—Waddey & Patterson, P.C.; Philip E. Walker

(57) ABSTRACT

An exposed aggregate concrete crack filler composition comprising multi-colored, non-homogeneous earth tone sand; and a liquid bonding agent is disclosed as well as a method of repairing cracks in exposed aggregate concrete, comprising providing a composition comprising a multi-colored, non-homogeneous earth tone sand and a liquid bonding agent; and administering said composition to a crack in an exposed aggregate concrete surface.

6 Claims, 1 Drawing Sheet

CONCRETE CRACK FILLER COMPOSITION AND METHOD

CROSS-REFERENCE TO RELATED APPLICATIONS

This application is a Divisional application which claims benefit of U.S. patent application Ser. No. 10/079,144 filed Feb. 19, 2002 now abandoned, entitled "Concrete Crack Filler Composition and Method", of which is hereby incorporated by reference in its entirety.

FIELD OF THE INVENTION

This invention relates to the field of concrete repair. More particularly, the present invention relates to methods and products associated with the repair of cracks that develop in exposed aggregate concrete.

BACKGROUND OF THE INVENTION

Generally speaking, there are three popular types of concrete finishes: exposed aggregate concrete, broom-swept concrete, and trowel finished concrete.

Concrete primarily comprises sand, cement, and aggregate. Exposed aggregate is a concrete finish wherein the top layer of concrete is washed off before it dries to expose the aggregate. Typically, the aggregate used in concrete construction is pea gravel.

A broom swept concrete finish is troweled, but while still wet the concrete is swept with a broom to provide a textured surface. This texture primarily provides slip resistance when the surface is wet. It is commonly used for sidewalks, some parking lots, and driveways. It is typically lighter in color than concrete that is troweled smooth.

Trowel finished concrete is concrete that is smoothed with a trowel upon being poured. A trowel is a flat-bladed hand tool for leveling, spreading, or shaping substances such as cement. Trowel finished smooth concrete is typically used for garage, warehouse, and other indoor floors. With respect to the exposed aggregate concrete, typically the top ⅛-¼" of the concrete is washed away after the initial pouring and after the concrete is troweled.

Several prior products with respect to concrete repair have been offered. Typically, the existing concrete crack fillers are gray in color and smooth in texture. The commercial concrete crack fillers are typically colored to match the color of a trowel finished concrete surface. Additionally, commercial crack fillers are typically smooth in texture to match the smooth surface of a trowel finish concrete surface.

German Patent No. DE 3617966 discloses a process for producing joint ceiling strips used in exposed aggregate parts. The process includes mixing the joint ceiling composition with a color component.

U.S. Pat. No. 4,205,040 discloses an exposed aggregate finishing method for in-situ concrete. In this method, the concrete setting retarder is protected by an organic high polymer that is water resistant, but soluble in an aqueous solution of cement alkaline.

U.S. Pat. No. 4,810,748 discloses a silicone sealer composition that allegedly exhibits excellent bonding characteristics to dolomite-containing concrete (such as a concrete highway). Additionally, this reference discloses that dolomite is used for aggregate in concrete. The sealant composition comprises a silane group, a crosslinking agent, an epoxy group, and a filler. Fillers include calcium carbonate, alumina, and glass microballons, etc. Pigments and dyes may be added to the composition.

U.S. Pat. No. 4,915,888 discloses a method of making a decorative cement block that includes a thin, surface dressing aggregate. A point aggregate of fine grain is sealed in a space between the surface dressing aggregate. The point aggregate may be sand. Further, the point aggregate may be "highly colorful" to harmonize with the dressing aggregate. A mortar or paste may be used to prevent displacement of the point aggregate. The mortar may have an acrylic reinforcing agent.

U.S. Pat. No. 5,634,037 discloses a liquid acrylic solution as a binding agent for cement, sand, and limestone mixture. The mixture is used to create artificial stones.

U.S. Pat. No. 6,016,635 discloses a method for forming a surface-seeded exposed aggregate concrete. The aggregate may include sand. More specifically, this patent is directed to a method of applying an exposed aggregate surface by broadcasting pea gravel on the surface of wet concrete, which is different then that typical method that is discussed above.

As discussed above, there are commercial products comprising latex emulsions that are designed to repair cracks in concrete. However, they are more designed for an all-purpose type repair and aesthetically only come close to matching the texture and appearance of trowel finished concrete.

What is needed, then, is a concrete repair product that blends aesthetically with respect to the texture and color of exposed aggregate concrete or the color and texture of broom-swept concrete.

SUMMARY OF THE INVENTION

The present invention is directed to an exposed aggregate concrete filler composition, comprising a multi-colored, non-homogeneous earth tone sand, and a liquid bonding agent.

The present invention is also directed to a broom-swept concrete crack filler composition comprising a multi-colored, non-homogeneous earth tone sand, and a liquid bonding agent.

Another embodiment of the present invention is a method of repairing cracks in exposed aggregate concrete. This embodiment comprises providing a composition, and administering the composition to a crack in an exposed aggregate concrete surface. The composition may comprise a multi-colored, non-homogeneous earth tone sand (i.e. different color shades and textures), and a liquid bonding agent. This method may also be used to prepare a crack in a broom-swept aggregate concrete surface.

The present invention is also directed to a method for repairing a crack in a concrete surface by comparing the concrete sand color, and using that color in the repair formulation. More specifically, this method comprises and allowing the color of the concrete to be repaired, and preparing a composition to administer to the crack in the concrete surface. In this embodiment, the composition comprises sand that is an aesthetically blending color with the color of the concrete to be repaired, and a liquid acrylic polymer bonding agent. With respect to the composition, the sand is present in an amount from about 60% to about 90% (weight/volume), and the liquid acrylic polymer bonding agent is present in the amount ranging from about 15% to about 35% (w/v), of the composition.

Additionally, an embodiment of the present invention is to provide a concrete crack repair kit. This repair kit comprises at least 2 sand batches of different consistency, different color shades, or different consistency and different color shades. The concrete crack repair kit of this embodiment also provides a liquid acrylic bonding agent, and a container wherein a sand batch a liquid acrylic bonding agent can be readily mixed to form a composition.

It is an object of the present invention to provide a method for repairing cracks that appear in aggregate concrete or broom-swept concrete.

It is another object of the present invention to provide a composition which may be used to repair cracks and aggregate for broom-swept concrete.

It is another object of the present invention to provide a method of repairing cracks in aggregate or broom-swept concrete that comprises selecting sand with a matching color and texture to be used in the composition that is applied to the crack.

Another object is to provide a method whereby exposed aggregate concrete and broom-swept concrete can be repaired in an aesthetically acceptable manner.

These and other objects, features, and advantages shall become apparent after consideration of the description and drawings set forth herein. All such objects, features, and advantages apparent to one of ordinary skill in the art are contemplated to be within the scope of the present invention even though not specifically set forth herein.

DESCRIPTION OF THE INVENTION

A common problem with respect to concrete surfaces is the formation of cracks. These cracks are unsightly and should be repaired to prevent further damage to the surface. However, many repair methods do not address the issue of the appearance of the crack after it has been repaired.

Exposed aggregate concrete surfaces and broom-swept concrete surfaces provide a difficult task in repairing the crack to be aesthetically pleasing because of the varied surfaces.

Figure 1:
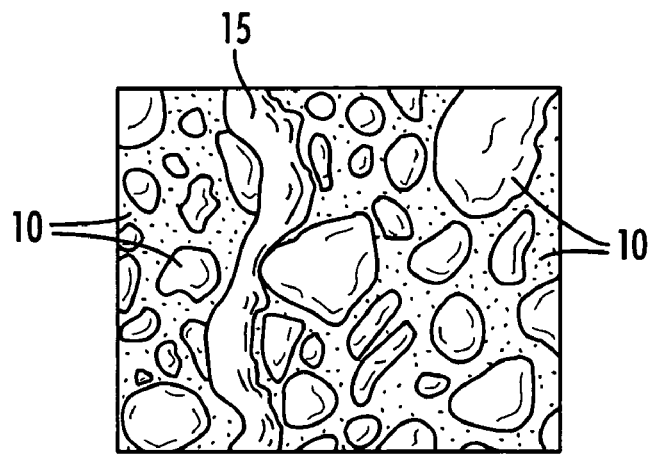
FIG. 1 shows an example of an aggregate concrete finish with a crack in the concrete.
Figure 2:
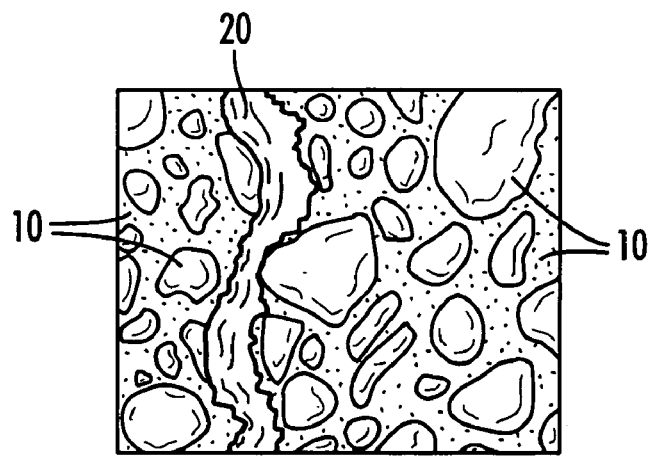
FIG. 2 shows a crack in aggregate concrete that has been repaired by using a prior art repair composition.
Figure 3:
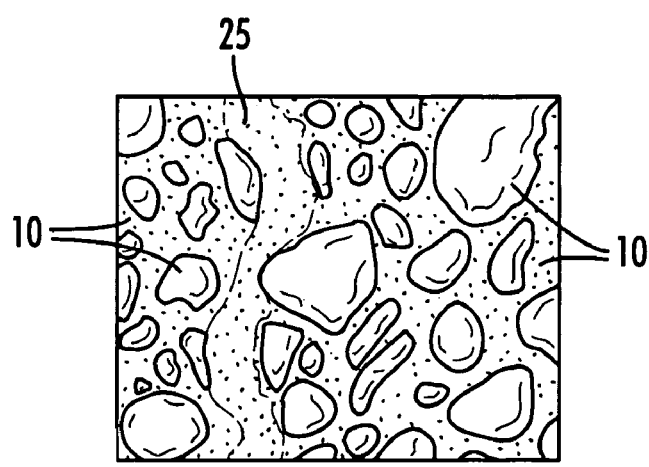
FIG. 3 shows a crack that appears in aggregate concrete that has been filled with a composition of the present invention.

FIG. 1 shows an example of an exposed aggregate surface 10. The surface 10 in FIG. 1 has a crack 15. FIG. 2 shows an example of an exposed aggregate surface 10 where a repaired crack 20 has been repaired with a commercially available, all-purpose crack repair material. As can be seen, the commercially available product does not match the exposed aggregate surface. On the other hand, FIG. 3 shows an exposed aggregate surface 10 with a repaired crack 25 that is repaired with the composition and method of the present invention. As can be see, the composition and method match the surface of the surface.

As stated above, an embodiment of the present invention is to provide an exposed aggregate concrete crack filler composition that comprises a multi-colored, non-homogeneous earth tone sand, and a liquid bonding agent. The sand that is used in the present invention provides texture and color so that, when repaired, the composition blends in with the original concrete surface.

Preferably, the sand is silica sand and has the similar sizes ranging from about 5 mm in diameter and smaller. Preferably, the size of the sand ranges from about 2 mm in size and smaller.

With respect to exposed aggregate concrete crack filler, the sand will typically have a speckled appearance, with various shades of brown. This appearance is designed to match the exposed aggregate.

As stated above, in preparing the exposed aggregate concrete, once the surface is washed, the surface has an appearance that is inconsistent both in grit and color.

In order to provide a composition that aesthetically matches the appearance of the exposed aggregate concrete filler, it is desired to have inconsistent grit and color, to aesthetically match the inconsistent grit and color of the sand used to make the concrete that is used for the surface.

Furthermore, in order to match the inconsistent color and grit of the aggregate concrete surface, the liquid bonding agent is preferably clear. That is, the composition of the present invention does not have any color or blackener. Preferably, the bonding agent is an acrylic polymer. Additionally, it is preferred that the bonding agent is an acrylic latex emulsion. An example of a preferred binder is UCAR® Latex 413, available from Dow Chemical Co., Danbury, Conn.

In the preferred embodiment, a composition of the present invention further comprises a plasticizer in an amount of about 1% w/v. The plasticizer gives the composition an elastic-type characteristic. Preferably, the plasticizer used in the present invention is dioctyl phthalate.

Additionally, the composition of the present invention further comprises alcohol. The presence of alcohol helps slow the drying of the composition and helps keep the composition from cracking. Preferably, an ester alcohol is used in the composition of the present invention. An example of an ester alcohol that may be used is Texanol® available from Eastman Chemical Company, Kingsport Tenn.

In the preferred embodiment, the sand is present in an amount of about 60% to about 95% (w/v) of the composition. As stated above, the purpose of the sand is to provide the unique aesthetics, texture, and color required to properly repair the crack in the aggregate concrete surface.

Preferably, the sand is present in an amount of about 75% w/v.

The bonding agent is typically present in an amount of from about 15% to about 30% w/v. Preferably, the bonding agent is present in an amount of about 25% w/v.

The composition of the present invention may be used to repair broom-swept concrete surfaces in addition to the aggregate surfaces discussed above. In this regard, the sand content will typically be a lighter color and the particles will typically be smaller and more uniform in size in order to match the appearance of the broom-swept concrete surface.

The present invention is also directed to a method of repairing cracks in exposed aggregate concrete. The method of the present invention comprises providing the composition described above, and administering the composition to a crack in exposed aggregate concrete surface.

Preferably, the composition is packaged in a single bottle that may be applied by the user without additional mixing.

In a preferred embodiment, the method of the present invention additionally comprises sealing the crack in the area of the crack with a concrete sealer. Preferably, an acrylic concrete sealer is used. An example of an acrylic concrete sealer is Superseal-30 ™, available from Clemons Concrete Coatings, LaVergne Tenn., or Eagle Premium Coat™, available from Eagle IFP Co., Smyrna, Tenn.

Preferably, the composition of this method comprises about 23-27% bonding agent, about 70-80% sand, about 0.5 to about 5% plasticizer, and about 0.5 to about 5% alcohol. All amounts are weight/volume.

Broom-swept concrete may be repaired in the same manner as described in the method above, however a different texture sand may be required to match the texture and color of the broom-swept surface.

In this regard, another embodiment of the present invention is a method for repairing a crack in a concrete surface by comparing the sand color that appears in the concrete and using that color in the repair formulation.

Most commercially available products only have a specific color gray that must be used on all types of surfaces. Additionally, they are smooth in texture. However, concrete surfaces certainly vary from area to area and vary depending upon the type of finished surfaces. In addition to the differences between aggregate and broom-swept concrete when compared to trowel concrete, the surfaces of exposed aggregate concrete and broom-swept concrete vary from one area of the country to the next depending on the sand used in the concrete formulation. Typically, the sand used in the concrete formulation is local in nature. Therefore, it varies in texture, size, and color.

The method of the present invention includes analyzing the color of the concrete to be repaired, and preparing a composition comprising sand that is an aesthetically blending color with the color of the concrete to be repaired and a liquid acrylic polymer bonding agent.

The method further includes administering the composition to the crack in the concrete surface. With respect to the sand and bonding agent content, any of the ranges disclosed herein may be used. Preferably, the sand is present in an amount of from about 60% to about 90% and the bonding, typically a liquid acrylic polymer, is present in an amount ranging from about 15% to about 35%.

This method further optionally comprises sealing the crack with an acrylic concrete sealer, as discussed above.

Finally, an additional embodiment of the present invention includes a concrete crack repair kit. This concrete crack repair kit provides at least two sand batches having different consistency, different color shades, or different consistency and different color shades. Therefore, an aesthetically pleasing sand with respect to at least color shade, consistency, and texture, may be selected to repair the concrete in a manner that will be less visible. Preferably, the repair kit will comprise a liquid acrylic bonding agent in a container wherein the sand, once selected, can be readily mixed in a container to provide the crack filler composition. In this regard, it is preferred that the container have a design wherein the sand batch and the liquid acrylic bonding agent can be readily mixed, and readily applied to the concrete.

The invention thus being described, it will be obvious that the same may be varied in many ways. Such variations are not to be regarded as a departure from the spirit and scope of the present invention, and all such modifications as would be obvious to one of ordinary skill in the art are intended to be included within the scope of this invention.

I claim:

1. Exposed aggregate concrete, comprising:
    a crack;
    exposed aggregate concrete adjacent the crack; and
    crack filler composition positioned in the crack and including:
        multi-colored, non-homogeneous earth tone sand, including a texture aesthetically matching the exposed aggregate concrete;
        a liquid bonding agent added to the multi-colored, non-homogeneous earth tone sand to aesthetically match the exposed aggregate concrete; and
        a dioctyl phthalate plasticizer and an ester alcohol.

2. A concrete crack repair kit for exposed aggregate concrete, comprising:
    at least two sand batches of different color shades;
    a liquid acrylic bonding agent;
    a container wherein the sand batches and the liquid acrylic bonding agent can be readily mixed to form a composition.

3. The concrete crack repair kit of claim 2, wherein the sand batches comprise multi-colored, non-homogeneous earth tone sand, and include textures aesthetically matching the exposed aggregate concrete.

4. The concrete crack repair kit of claim 2, wherein the liquid bonding agent is clear after drying.

5. The concrete crack repair kit of claim 2, wherein the sand batches are of different consistencies.

6. A concrete crack repair kit for exposed aggregate concrete, comprising:
    at least two sand batches of different consistency, each sand batch including multi-colored, non-homogeneous earth tone sand aesthetically matching the exposed aggregate concrete and including textures aesthetically matching the exposed aggregate concrete;
    a clear drying liquid acrylic bonding agent;
    a container wherein the sand batches and the liquid acrylic bonding agent can be readily mixed to form a composition.

* * * * *

UNITED STATES PATENT AND TRADEMARK OFFICE
CERTIFICATE OF CORRECTION

PATENT NO.      : 7,572,852 B1                                    Page 1 of 1
APPLICATION NO. : 11/358704
DATED           : August 11, 2009
INVENTOR(S)     : Don H. Ware It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 791 days.

Signed and Sealed this

Fourteenth Day of December, 2010

David J. Kappos
*Director of the United States Patent and Trademark Office*